(12) United States Patent
Bin (10) Patent No.: US 11,390,179 B2
(45) Date of Patent: Jul. 19, 2022

(54) VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventor: Seunghyeon Bin, Busan (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/080,465

(22) Filed: Oct. 26, 2020

(65) Prior Publication Data

US 2021/0380005 A1 Dec. 9, 2021

(30) Foreign Application Priority Data

Jun. 5, 2020 (KR) .................. 10-2020-0068021

(51) Int. Cl.
| | |
|---|---|
| H02P 27/04 | (2016.01) |
| B60L 53/24 | (2019.01) |
| H02P 27/08 | (2006.01) |
| B60L 15/00 | (2006.01) |
| B60L 50/51 | (2019.01) |

(52) U.S. Cl.
CPC ............ *B60L 53/24* (2019.02); *B60L 15/007* (2013.01); *B60L 50/51* (2019.02); *H02P 27/08* (2013.01)

(58) Field of Classification Search
CPC ........ B60L 53/24; B60L 50/51; B60L 15/007; H02P 27/08; H02P 27/06; H02P 29/024
See application file for complete search history.

(56) References Cited

U.S. PATENT DOCUMENTS

| | | | |
|---|---|---|---|
| 2019/0031041 A1* | 1/2019 | Rozman | .............. H02M 7/2176 |
| 2019/0031125 A1* | 1/2019 | Rozman | .................. B60L 50/51 |

\* cited by examiner

*Primary Examiner* — Karen Masih
(74) *Attorney, Agent, or Firm* — Slater Matsil, LLP (57) ABSTRACT

A vehicle may include a motor including first, second, and third windings connected to the neutral node; an inverter including first switching elements, second switching elements, third switching elements; a battery configured to receive the boosted voltage; a first current sensor; a second current sensor; a third current sensor; and a controller may determine an average duty ratio of a pulse width modulated signal based on the charging voltage and battery voltage of the battery, and determine a duty ratio of a pulse width modulated signal, and the controller may determine the duty ratio of the pulse width modulated signal provided to the first switching elements based on the average duty ratio of the pulse width modulated signal provided to the inverter, to the second switching elements, and to the third switching elements when the first current sensor fails.

20 Claims, 4 Drawing Sheets

VEHICLE AND METHOD FOR CONTROLLING THEREOF

CROSS-REFERENCE TO RELATED APPLICATION

The present application claims priority to and the benefit of Korean Patent Application No 10-2020-0068021, filed on Jun. 5, 2020, the entire contents of which is incorporated herein for all purposes by this reference.

TECHNICAL FIELD

The present disclosure relates to a vehicle and a control method thereof, and more particularly, to a vehicle and a control method in which continuing charging using a non-failed current sensor even if the current sensor that measures the 3-phase current fails while charging the battery.

BACKGROUND

In general, an electric vehicle or a plug-in hybrid vehicle may generate vehicle power by charging a battery in the vehicle by receiving power provided from an external charger, and driving a motor using electric energy stored in the charged battery.

The in-vehicle battery charging method is classified as a slow charging method that charges the battery at a relatively slow speed using a vehicle-mounted charger that receives external AC charging power and converts it into DC charging power of a size suitable for battery charging, and as a fast charging method that quickly charges the battery by providing external DC charging power directly to the battery.

In the case of the fast charging method, the battery can be charged with high power by supplying direct current (DC) power converted from an external charger to the battery of the vehicle.

SUMMARY

Various aspects of the present disclosure are directed to providing a vehicle and a control method thereof configured for continuously charging the battery even if the current sensor measuring 3-phase current fails.

In accordance with an aspect of the present disclosure, a vehicle may include a motor including a neutral node receiving a charging voltage from a charger and first, second, and third windings connected to the neutral node; an inverter including first switching elements connected to the first winding, second switching elements connected to the second winding, third switching elements connected to the third windings, and configured to boost the charging voltage supplied from the charger; a battery configured to receive the boosted voltage boosted by the inverter; a first current sensor configured to measure a first phase current flowing through the first winding; a second current sensor configured to measure a second phase current flowing through the second winding; a third current sensor configured to measure a third phase current flowing through the third winding; and the controller may determine the duty ratio of the pulse width modulated signal provided to the first switching elements based on the average duty ratio of the pulse width modulated signal provided to the inverter, the duty ratio of the pulse width modulated signal provided to the second switching elements, the duty ratio of the pulse width modulated signal provided to the third switching elements when the first current sensor fails.

The controller may determine the duty ratio of the pulse width modulated signal provided to the first switching elements so that the average of the duty ratio of the pulse width modulated signal provided to the first switching elements, the duty ratio of the pulse width modulated signal provided to the second switching elements, and the duty ratio of the pulse width modulated signal provided to the third switching elements becomes the average duty ratio of the pulse width modulated signal provided to the inverter.

The controller may determine the duty ratio of the pulse width modulated signal provided to the first, and second switching elements based on the average duty ratio of the pulse width modulated signal provided to the inverter, the duty ratio of the pulse width modulated signal provided to the third switching elements when the first current sensor and the second current sensor fail.

The controller may determine the duty ratio of the pulse width modulated signal provided to the first, and second switching elements so that the average of the duty ratio of the pulse width modulated signal provided to the first switching elements, the duty ratio of the pulse width modulated signal provided to the second switching elements, and the duty ratio of the pulse width modulated signal provided to the third switching elements becomes the average duty ratio of the pulse width modulated signal provided to the inverter.

The controller may equally determine the duty ratio of the pulse width modulated signal provided to the first and second switching elements.

The controller may perform pulse width modulation control on the inverter only when at least one current sensor among the first, second, and third current sensors operates normally.

The vehicle may further include a temperature sensor configured to measure temperature of each of the first switching elements, each of the second switching elements, and each of the third switching elements, and the controller may perform pulse width modulation control on the inverter only when the temperature measured by the temperature sensor is below a preset temperature.

The controller may perform pulse width modulation control on the inverter so that a ON period of the pulse width modulated signal provided to the first switching elements, a ON period of the pulse width modulated signal provided to the second switching elements, and a ON period of the pulse width modulated signal provided to the third switching elements are interleaved.

The vehicle may further include an input/output port connected to the charger; a first relay connected between upper switching elements of the inverter and the input/output port; a second relay connected between the neutral node and the input/output port; and a third relay connected between lower switching elements of the inverter and the input/output port; and the controller may close the second relay and the third relay and opens the first relay when the charging voltage provided from the charger is less than the battery voltage of the battery.

The controller may close the first relay and the third relay and opens the second relay when the charging voltage provided from the charger is greater than or equal to the battery voltage of the battery.

In accordance with an aspect of the present disclosure, a controlling method of a vehicle may include receiving a charging voltage from a charger through a neutral node of a motor; boosting the charging voltage supplied from the charger by an inverter connected to the motor; receiving the boosted voltage boosted by the inverter; measuring a first phase current flowing through the first winding of the motor by the first current sensor; measuring a second phase current flowing through the second winding of the motor by the second current sensor; measuring a third phase current flowing through the third winding of the motor by the third current sensor; determining an average duty ratio of a pulse width modulated signal provided to the inverter based on the charging voltage and battery voltage of the battery, determining a duty ratio of a pulse width modulated signal provided to each of the first, second, third switching elements based on the first, second, third phase currents; and determining the duty ratio of the pulse width modulated signal provided to the first switching elements based on the average duty ratio of the pulse width modulated signal provided to the inverter, the duty ratio of the pulse width modulated signal provided to the second switching elements, the duty ratio of the pulse width modulated signal provided to the third switching elements when the first current sensor fails.

Determining the duty ratio of the pulse width modulated signal provided to the first switching elements may comprise, determining the average of the duty ratio of the pulse width modulated signal provided to the first switching elements, the duty ratio of the pulse width modulated signal provided to the second switching elements, and the duty ratio of the pulse width modulated signal provided to the third switching elements becomes the average duty ratio of the pulse width modulated signal provided to the inverter.

The method may further comprise: determining the duty ratio of the pulse width modulated signal provided to the first, and second switching elements based on the average duty ratio of the pulse width modulated signal provided to the inverter, the duty ratio of the pulse width modulated signal provided to the third switching elements when the first current sensor and the second current sensor fail.

Determining the duty ratio of the pulse width modulated signal provided to the first, and second switching elements may include determining the duty ratio of the pulse width modulated signal provided to the first, and second switching elements so that the average of the duty ratio of the pulse width modulated signal provided to the first switching elements, the duty ratio of the pulse width modulated signal provided to the second switching elements, and the duty ratio of the pulse width modulated signal provided to the third switching elements becomes the average duty ratio of the pulse width modulated signal provided to the inverter.

Determining the duty ratio of the pulse width modulated signal provided to the first, and second switching elements may include equally determining the duty ratio of the pulse width modulated signal provided to the first and second switching elements.

The method may further comprise: performing pulse width modulation control on the inverter only when at least one current sensor among the first, second, and third current sensors operates normally.

The method may further include measuring temperature of each of the first switching elements, each of the second switching elements, and each of the third switching elements, and performing pulse width modulation control on the inverter only when the temperature measured by the temperature sensor is below a preset temperature.

The method may further include performing pulse width modulation control on the inverter so that a ON period of the pulse width modulated signal provided to the first switching elements, a ON period of the pulse width modulated signal provided to the second switching elements, and a ON period of the pulse width modulated signal provided to the third switching elements are interleaved.

The method may further include, when the charging voltage provided from the charger is less than the battery voltage of the battery, closing a second relay connected between the neutral node and the input/output port, and a third relay connected between lower switching elements of the inverter and the input/output port; and opening a first relay connected between upper switching elements of the inverter and the input/output port;

The method may further include: closing the first relay and the third relay and opening the second relay when the charging voltage provided from the charger is greater than or equal to the battery voltage of the battery.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, like reference numerals refer to like elements throughout the specification. This specification does not describe all elements of the embodiments, and in the technical field, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements. In addition, the term "unit" used in the specification refers to a hardware component such as software, FPGA, or ASIC, and "unit" performs certain roles. However, "unit" is not meant to be limited to software or hardware. The "unit" may be configured to be in an addressable storage medium or may be configured to reproduce one or more processors. Thus, as an example, "unit" refers to components such as software components, object-oriented software components, class components, and task components, processes, functions, properties, procedures, subroutines, segments of program code, drivers, firmware, microcode, circuitry, data, database, data structures, tables, arrays and variables. The functions provided within the components and "units" may be combined into a smaller number of components and "units" or may be further separated into additional components and "units".

Hereinafter, embodiments of the present disclosure will be described with reference to the accompanying drawings. And in order to clearly describe the disclosure disclosed in the drawings, parts not related to the description will be omitted. In addition, in the drawings, the same reference numerals denote the same components, and redundant descriptions thereof will be omitted.

Figure 1:
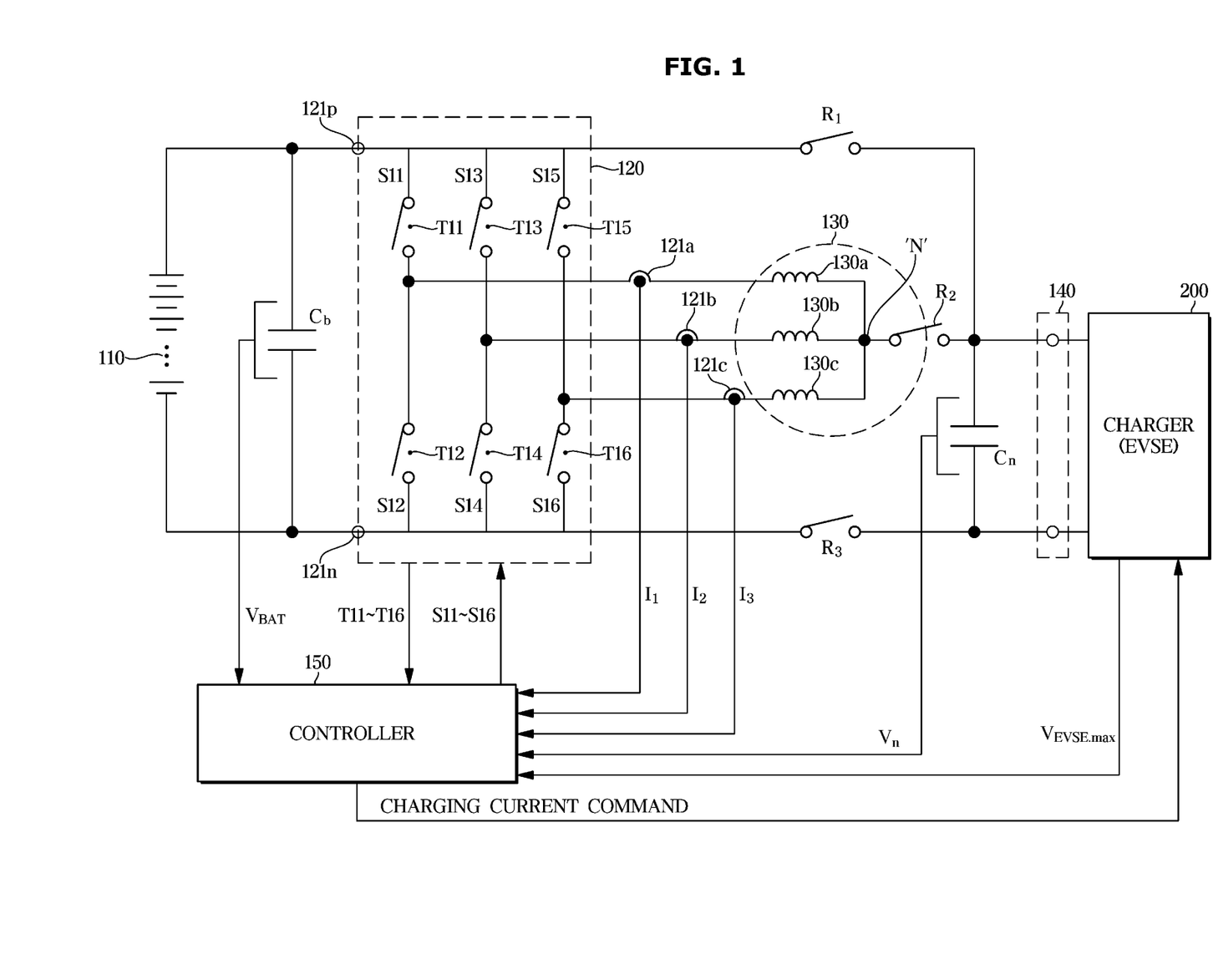
FIG. 1 is a block diagram of a charging system included in a vehicle in one form of the present disclosure.
Figure 2:
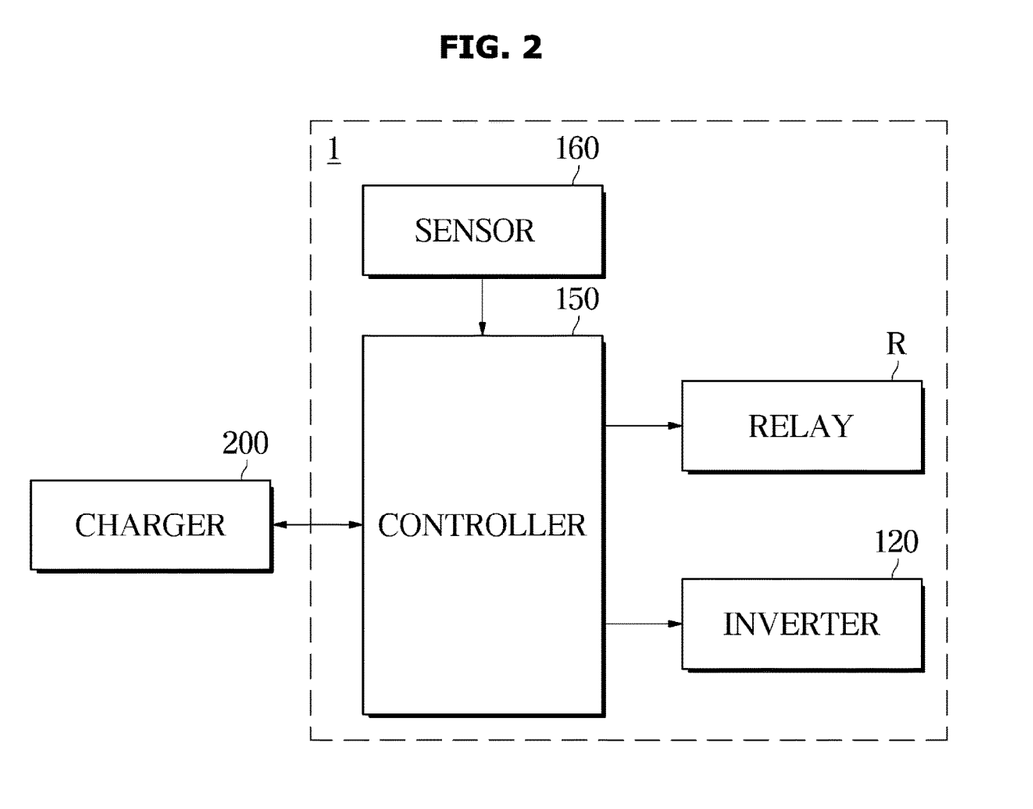
FIG. 2 is a control block diagram of a vehicle in one form of the present disclosure.

FIG. 1 is a block diagram of a charging system included in a vehicle according to an embodiment, and FIG. 2 is a control block diagram of a vehicle according to an embodiment.

In the case of a fast charging method, an external fast charger may not be able to provide a voltage sufficient to charge the battery of the vehicle. For example, an external quick charger for quick charging may be manufactured to output a single voltage standard of 400V, while a battery used in a vehicle may be designed to have a voltage standard of 800V or higher.

In this case, the fast charger provides a charging voltage of 400V, but the battery used in the vehicle has a voltage standard of 800V or more, it is impossible to charge the battery by connecting the fast charger directly to the vehicle, Therefore, for charging, a boosting converter for boosting the voltage provided from an external charger is separately required.

However, the boosting converter for boosting the voltage provided from an external charger is not only very large in weight and volume, but also has a high price, which may cause an increase in the price of the vehicle.

In order to solve this problem, the vehicle according to an embodiment may charge the battery at a high voltage by boosting the charging voltage of the charger using a conventional motor and an inverter without a separate converter.

Referring to FIG. 1, a charging system included in the vehicle 1 according to an embodiment includes a battery 110, an inverter 120, a motor 130, and a plurality of relays $R_1$, $R_2$, and $R_3$ provided in the vehicle 1.

In general, the system for driving the motor 130, includes a battery 110 which is an energy storage device that stores power for driving the motor 130, and an inverter 120 that converts DC power stored in the battery 110 into 3-phase AC and provides it to the motor 130.

Inverter 120 may have a DC connection terminal including a positive (+) terminal 121p and a negative (−) terminal 121n, respectively connected to both ends of the battery 110, and three legs connected in a parallel relationship between the DC connection terminals. Each leg has two switching elements (S11 and S12 or S13 and S14 or S15 and S16) connected in series with each other. Connection nodes of the two switching elements may be connected to respective windings 130a, 130b, and 130c of the motor 130, respectively. Respective windings 130a, 130b, and 130c of motor 130 may be made of insulated wire to be a coil.

In other words, the inverter 120 is composed of three upper switching elements (S11, S13, S15) and three lower switching elements (S12, S14, S16), each of the upper switching elements (S11, S13, S15) is connected to any one of the three lower switching elements (S12, S14, S16), and connection nodes to which the upper switching elements S11, S13, and S15 and the lower switching elements S12, S14, and S16 are connected may be connected to the windings 130a, 130b, and 130c of the motor 130, respectively.

The plurality of switching elements S11 to S16 included in the inverter 120 may refer to an insulated gate bipolar transistor (IGBT), On/off of the switching elements S11 to S16 may be controlled according to the gate voltage provided to the gate.

Hereinafter, for convenience of description, the upper switching element S11 and the lower switching element S12 connected to the first winding 130a of the motor 130 are referred to as first switching elements S11 and S12, the upper switching element S13 and the lower switching element S14 connected to the second winding 130b of the motor 130 referred to as second switching elements S13 and S14, and the upper switching element S15 and the lower switching element S16 connected to the third winding 130c of the motor 130 referred to as third switching elements S15 and S16.

In order to provide current to the motor 130 as much as a current command corresponding to the torque of the motor 130 to be obtained through the driving of the motor 130, Pulse With Modulation (PWM) control may be performed on the switching elements S11 to S16 in the inverter 120. As such, the flow of energy for driving the motor 130 is made from the battery 110 to the motor 130.

On the other hand, the flow of energy for charging the battery 110 may be made from the motor 130 to the battery 110.

Specifically, powering may be performed in the direction from the neutral end (N) of the motor 130 to the DC connection terminals 121p and 121n of the inverter 120. At this time, each of the first switching elements S11 and S12, the second switching elements S13 and S14, and the third switching elements S15 and S16, and each of the first winding 130a, and the second winding 130b, and the third winding 130c can configure one DC converter circuit that boosts the voltage provided to the neutral node N connected to the first winding 130a, the second winding 130b, and the third winding 130c to the DC connection terminals 121p and 121n.

Therefore, the connection structure between the inverter 120 and the windings 130a, 130b, 130c in the motor 130 is the same as that a total of three converter circuits are connected in parallel. The voltage of the neutral node (N) may be boosted and provided to the battery 110 by simultaneously or selectively operating a plurality of DC converters connected in parallel, or by controlling the switching elements S11 to S16 to operate interleaved by the controller 150.

According to the vehicle 1 according to an embodiment may selectively use a first charging mode providing external charging power directly to the battery 110 based on the maximum voltage ($V_{EVSE.max}$) of external charging power provided from the external charger 200 to the charging input/output port 140 of the vehicle 1 and the battery voltage ($V_{BAT}$) of the battery 110, and a second charging mode in which the voltage provided to the neutral node N is boosted by controlling the switching elements of the inverter 120 and provided to the battery 110 after external charging power is provided to the neutral node (N) of the motor 130

In the above, the process of charging the battery 110 using the charging system of the vehicle 1 has been briefly described.

Meanwhile, in the vehicle 1 according to the above-described embodiment, when any one of the current sensors measuring the three-phase current fails, charging of the battery may be stopped. If charging is interrupted due to a current sensor failure, the battery cannot be charged any more without repairing or replacing the current sensor, which may cause inconvenience to the user.

Hereinafter, the role of each component of the charging system included in the vehicle 1 according to an exemplary embodiment will be described in detail, thereby describing a method of continuously charging a battery without interruption even when a current sensor fails.

Referring to FIGS. 1, and 2, vehicle 1 according to an embodiment includes a sensor 160 that detects the output value of each component of the charging system, a relay R for changing the battery charging mode, and an inverter 120 for boosting the voltage provided from the charger 200, and a controller 150 that controls the relay R and the inverter 120 based on the detection value of the sensor 160 and the information of the charging voltage received from the charger 200.

Sensor 160 according to an embodiment includes a current sensor (hereinafter "first current sensor") 121*a* that measures the first phase current I1 flowing through the first winding 130*a* of the motor 130, a current sensor measuring the second phase current I2 flowing through the second winding 130*b* of the motor 130 (hereinafter "second current sensor") 121*b*, and a current sensor (hereinafter referred to as "third current sensor") 121*c* for measuring the third phase current I3 flowing through the third winding 130*c* of the motor 130. For example, as the current sensors 121*a*, 121*b*, 121*c*, a Hall type current sensor may be employed.

The first phase current I1, the second phase current I2, and the third phase current I3 may mean any one of a U-phase current, a V-phase current, and a W-phase current, respectively. For example, the first phase current I1 may be a U-phase current, the second phase current I2 may be a V-phase current, and the third phase current I3 may be a W-phase current, but are not limited thereto.

The current sensors 121*a*, 121*b*, and 121*c* may transmit the measured current to the controller 150.

The sensor 160 may include temperature sensors T11, T12, T13, T14, T15, and T16 provided in each of the plurality of switching elements S11 to S16 included in the inverter 120.

The sensor 160 may include a first voltage sensor capable of measuring the voltage Vn provided to the neutral node N of the motor 130 by measuring the potential difference of the first capacitor Cn connected to both ends of the input/output port 140 (not shown), and a second voltage sensor (not shown) capable of measuring a battery voltage $V_{BAT}$ of the battery 110 by measuring a potential difference between the second capacitor Cb connected to both ends of the battery 110.

The voltage measured by the first voltage sensor (not shown) and the voltage measured by the second voltage sensor (not shown) may be transmitted to the controller 150.

The sensor 160 may also include temperature sensors T11 to T16 that measure the temperature of each of the plurality of switching elements S11 to S16 included in the inverter 120. As an example, a chip type temperature sensor may be employed as the temperature sensors T11 to T16.

Temperature values of the plurality of switching elements S11 to S16 measured by the temperature sensors T1 to T16 may be transmitted to the controller 150.

The relay R according to an embodiment may include a plurality of relays R1, R2, and R3 provided between the input/output port 140 connected to the external charger 200 and the battery 110.

Specifically, relay R may include a relay (hereinafter referred to as "first relay") R1 connected between the upper switching elements S11, S13, S15 of the inverter 120 and the input/output port 140, and a relay connected between the neutral node (N) of the motor 130 and the input/output port 140 (hereinafter referred to as "second relay") (R2), and a relay (hereinafter referred to as "third relay") R3 connected between the lower switching elements S12, S14, and S16 of the inverter 120 and the input/output port 140.

Each of the plurality of relays R1, R2, and R3 may be closed or opened according to a control signal from the controller 150 to change the charging mode of the battery 110.

As described above, the inverter 120 may include a plurality of switching elements S11 to S16, and may boost a voltage provided to the neutral node N of the motor 130 and provide it to the battery 110.

The controller 150 may control the relay R and the inverter 120 based on various outputs received from the sensor 160 and/or the maximum charging voltage ($V_{EVSE.max}$) received from the charger 200.

For example, controller 150 can control relay R based on the maximum charging voltage ($V_{EVSE.max}$) received from the charger 200 or the voltage (Vn) measured at both ends of the first capacitor (Cn) and the battery voltage ($V_{BAT}$) of the battery 110, which is the voltage measured at both ends of the second capacitor (Cb).

Specifically, when the size of the charging voltage Vn provided from the charger 200 is smaller than the size of the battery voltage $V_{BAT}$ of the battery 110, the controller 150 may close the second relay R2 and the third relay R3 and open the first relay R1. Accordingly, the charging mode of the battery 110 may be changed to the second charging mode.

In addition, when the size of the charging voltage Vn provided from the charger 200 is greater than the size of the battery voltage $V_{BAT}$ of the battery 110, the controller 150 may close the first relay R1 and the third relay R3 and open the second relay R2. Accordingly, the charging mode of the battery 110 may be changed to the first charging mode.

The controller 150 may determine an Average duty ratio (D) of the pulse width modulated signal provided to the inverter 120 based on the charging voltage Vn provided to the neutral node N of the motor 130 and the battery voltage $V_{BAT}$ of the battery 110, and perform Pulse width modulation control on the inverter 120 based on the determined average duty ratio D.

However, only when it is determined that at least one current sensor (121*a*, 121*b*, 121*c*) is operating normally or the temperature of all of the plurality of switching elements (S11 to S16) is below a preset temperature, the controller 150 may perform pulse width modulation control on the inverter 120.

In other words, if it is determined that all the current sensors 121*a*, 121*b*, 121*c* have failed or the temperature of at least one of the plurality of switching elements S11 to S16 is greater than a preset temperature, for safety reasons, the charging process can be stopped.

The controller 150 for performing the above-described operation or an operation to be described later includes an algorithm for controlling various configurations of the vehicle 1 such as the inverter 120 and the relay R, or a memory for storing data about a program that reproduces the algorithm, and a processor that performs the above-described operation using data stored in the memory.

In this case, the memory and the processor may be implemented as separate chips, respectively, but the memory and the processor may be implemented as a single chip The controller 150 may be implemented in the form of a vehicle controller, a motor controller, or a battery management system provided in an existing vehicle, or may be additionally provided in the vehicle.

Specific operations and effects of the controller 150 will be described in detail later.

Figure 3:
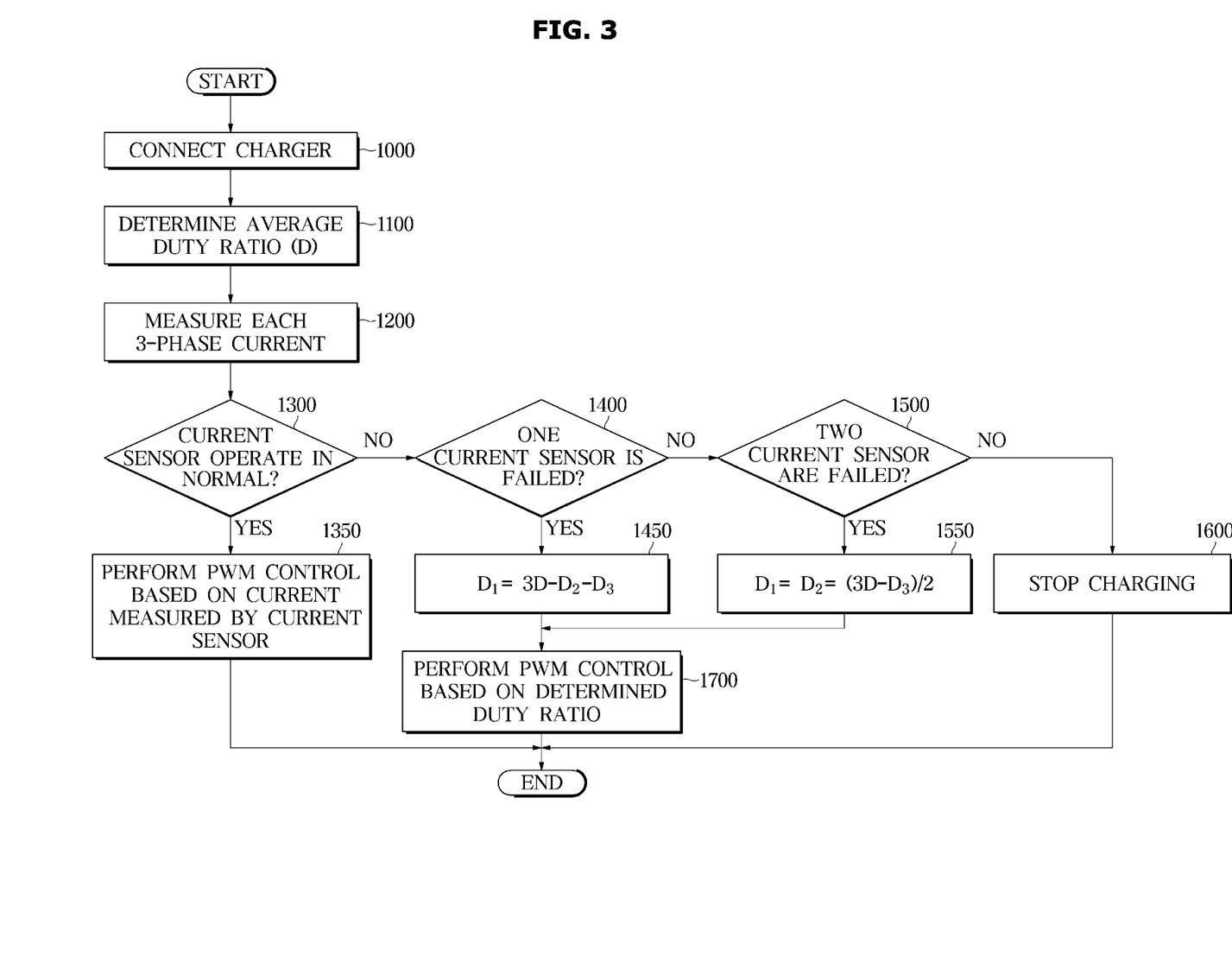
FIG. 3 is a flowchart illustrating a vehicle control in one form of the present disclosure.

FIG. 3 is a flowchart illustrating a vehicle control according to an embodiment.

Referring to FIG. 3, the controller 150 may sense the connection of the charger 200 and receive information on the maximum charging voltage $V_{EVSE.max}$ from the charger 200 (1000).

As described above, the controller 150 may determine the charging mode of the battery 110 based on the battery voltage ($V_{BAT}$) of the battery 110 and the maximum charging voltage ($V_{EVSE.max}$) of the charger 200, hereinafter, it is assumed that the charging mode of the battery 110 is the second charging mode.

The controller 150 may determine an average duty ratio (D) of the pulse width modulated signal provided to the inverter 120 based on the charging voltage (Vn) provided to the neutral node (N) of the motor 130 and the battery voltage ($V_{BAT}$) of the battery 110.

Specifically, the controller 150 may determine the average duty ratio (D) of the pulse width modulated signal based on the following $$D = 1 - Vn/V_{BAT} \quad \text{[Equation 1]}$$

For example, when the battery voltage $V_{BAT}$ of the battery 110 is 800V and the charging voltage Vn is 400V, the average duty ratio D may be determined to be 0.5.

In this case, the duty ratio may mean a ratio between (On period+Off period) and (On period) of the switching elements S11 to S16. For example, if the (On period+Off period) of the switching elements S11 to S16 is 2 seconds and the (On period) is 1 second, the duty ratio may be determined as 0.5.

The first current sensor 121a measures the first phase current I1 flowing through the first winding 130a, the second current sensor 121b measures the second phase current I2 flowing through the second winding 130b, the third current sensor 121c may measure the third phase current I3 flowing through the third winding 130c, and the controller 150 may receive current values measured from the first current sensor 121a, the second current sensor 121b, and the third current sensor 121c (1200).

The controller 150 may determine the duty ratio (D1) of the pulse width modulated signal provided to the first switching elements (S11, S12), the duty ratio D2 of the pulse width modulated signal provided to the second switching elements S13 and S14, and the duty ratio D3 of the pulse width modulated signal provided to the third switching elements S15 and S16 o that the first phase current I1, the second phase current I2, and the third phase current I3 become the same based on the current value measured by each current sensor (121a, 121b, 121c).

For example, when the magnitude of the first phase current I1 and the magnitude of the second phase current I2 are the same and the magnitude of the third phase current I3 is smaller than the magnitude of the first phase current I1, the controller reduces the duty ratios (D1, D2) of the pulse width modulated signal provided to the first switching elements (S11, S12) and the second switching elements (S13, S14), and increases the duty ratio D3 of the pulse width modulated signal provided to the third switching elements S15 and S16.

In this way, by performing feedback control on the current values measured by the current sensors 121a, 121b, 121c, the controller 150 may determine individual duty ratios of the pulse width modulated signals provided to the first switching elements S11 and S12, the second switching elements S13 and S14, and the third switching elements S15 and S16.

When the current value measured by the current sensors 121a, 121b, and 121c does not fall within a preset range, the controller 150 may determine that the current sensors 121a, 121b, and 121c measuring the corresponding current value have failed.

For example, when the first phase current I1 measured by the first current sensor 121a does not fall within a preset range, the controller 150 may determine that the first current sensor 121a has failed.

When all current sensors operate normally (YES in 1300), the controller 150 may perform pulse width modulation control on the inverter 120 (1350) based on the average duty ratio (D) and the individual duty ratios (D1, D2, D3) determined according to the current values measured by the current sensors 121a, 121b, 121c.

When it is determined that any one of the current sensors 121a, 121b, or 121c has failed (example of 1400), the controller 150 may determine the duty ratio of the pulse width modulated signal provided to the switching elements connected to the failed current sensor based on the current measured by the non-failed current sensor.

For example, the controller 150 may determine the duty ratio D1 of the pulse width modulated signal provided to the first switching elements S11 and S12 (1450) when the first current sensor 121a fails based on the average duty ratio (D) of the pulse width modulated signal provided to the inverter 120, the duty ratio (D2) of the pulse width modulated signal provided to the second switching elements (S13, S14) and the duty ratio (D3) of the pulse width modulated signal provided to the third switching elements (S15, S16).

Specifically, the controller 150 may determine the duty ratio D1 of the pulse width modulated signal provided to the first switching elements S11 and S12 so that the average of the duty ratio (D1) of the pulse width modulated signal provided to the first switching elements (S11, S12), the duty ratio (D2) of the pulse width modulated signal provided to the second switching elements (S13, S14), and the duty ratio (D3) of the pulse width modulated signal provided to the third switching elements (S15, S16) becomes the average duty ratio (D) of the pulse width modulated signal provided to the inverter 120.

That is, the controller may determine the duty ratio D1 of the pulse width modulated signal provided to the first switching elements S11 and S12 so that the following [Equation 2] is satisfied.

$$D1 = 3*D - D2 - D3 \quad \text{[Equation 2]}$$

Thereafter, the controller 150 may perform pulse width modulation control on the inverter 120 based on the determined individual duty ratios D1, D2, and D3 (1700).

When it is determined that two of the current sensors (two among 121a, 121b, 121c among the current sensors 121a, 121b, or 121c have failed (Yes in 1500), the controller 150 may determine the duty ratio of the pulse width modulated signal provided to the switching elements connected to the failed current sensors based on the current measured by the non-failed current sensor.

For example, when the first current sensor 121a and the second current sensor 121b fail, the controller 150 may determine a duty ratio (D1) of a pulse width modulated signal provided to the first switching elements (S11, S12) and a duty ratio (D2) of the pulse width modulated signal provided to the second switching elements (S13, S14) based on the average duty ratio (D) of the pulse width modulated signal provided to the inverter 120 and the duty ratio (D3) of the pulse width modulated signal provided to the third switching elements (S15, S16).

Specifically, the controller 150 determines is a duty ratio (D1) of a pulse width modulated signal provided to the first switching elements (S11, S12) and a duty ratio (D2) of the pulse width modulated signal provided to the second switching elements (S13, S14) so that an average of the duty ratio (D1) of the pulse width modulated signal provided to the first switching elements (S11, S12), the duty ratio (D2) of the pulse width modulated signal provided to the second switching elements (S13, S14), and the duty ratio (D3) of the pulse width modulated signal provided to the switching elements S15 and S16 becomes the average duty ratio (D) of the pulse width modulated signal provided to the inverter 120.

At this time, controller 150 may equally determine the duty ratio (D1) of the pulse width modulated signal provided to the first switching elements S11, and S12 and the duty ratio D2 of the pulse width modulated signal provided to the second switching elements S13 and S14.

That is, the controller may determine a duty ratio (D1) of the pulse width modulated signal provided to the first switching elements (S11, S12) and the duty ratio (D2) of the pulse width modulated signal provided to the second switching elements (S13, S14) so that the following [Equation 3] is satisfied.

$$D1=D2=(3*D-D3)/2 \quad \text{[Equation 3]}$$

Thereafter, the controller 150 may perform pulse width modulation control on the inverter 120 based on the determined individual duty ratios D1, D2, and D3 (1700).

When it is determined that all of the current sensors 121a, 121b, and 121c have failed (NO of 1500), the controller 150 may stop the charging process (1600).

For example, the controller 150 may open all of the plurality of relays R1, R2, and R3 so that the input/output port 140 and the battery 110 are not connected.

That is, the controller 150 may perform pulse width modulation control on the inverter 120 only when at least one of the first current sensor 121a, the second current sensor 121b, and the third current sensor 121c operates normally.

As described above, according to an embodiment of the present disclosure, if any one of the current sensors normally operates, the user's convenience may be achieved by performing a charging process.

However, even if the switching element fails, since the current measured by the current sensor does not fall within the preset range, if this is determined as a failure of the current sensor and the charging process proceeds, it may cause damage to internal parts of the vehicle.

Therefore, the controller 150 can stop the charging process when the temperature of any one of the first switching elements S11 and S12, the second switching elements S13 and S14, and the third switching elements S15 and S16 is higher than a preset temperature.

That is, the controller 150 may perform pulse width modulation control on the inverter 120 only when the temperatures measured by the first switching elements S11 and S12, the second switching elements S13 and S14, and the third switching elements S15 and S16 are all below a preset temperature.

Figure 4:
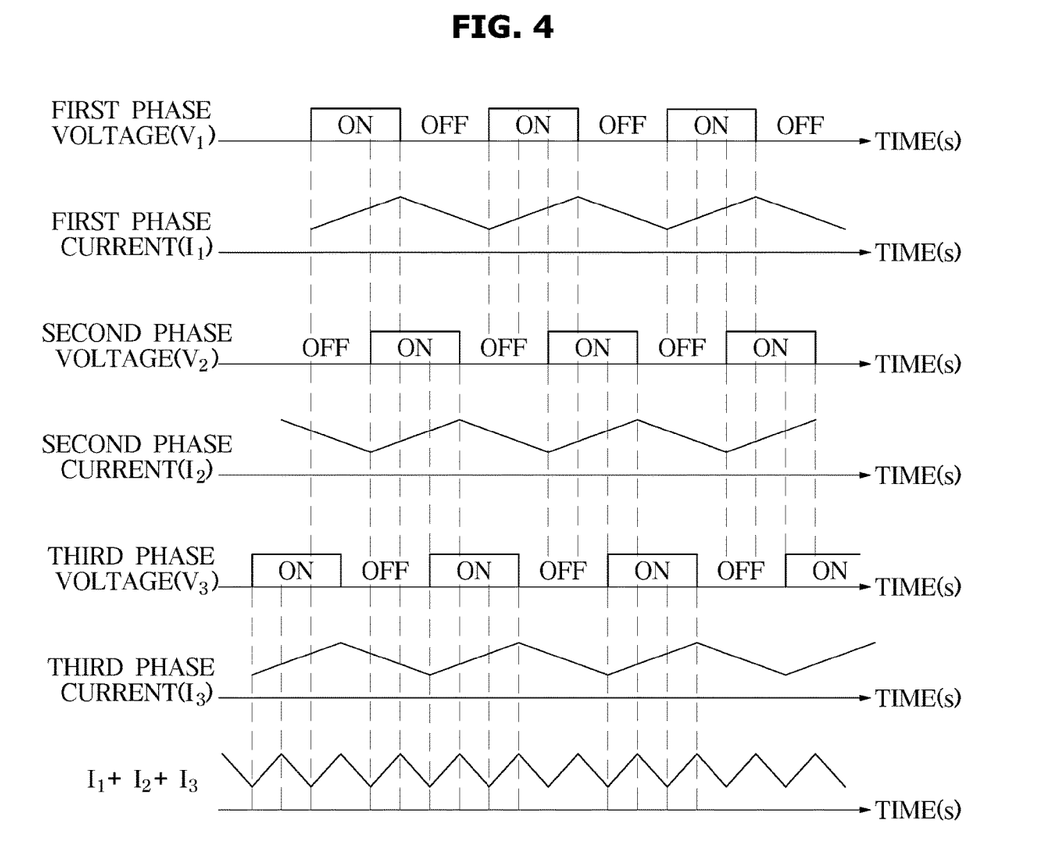
FIG. 4 is an exemplary diagram showing a pulse width modulated (PWM) signal applied to an inverter and a three-phase current according to it over time.

FIG. 4 is an exemplary diagram showing a pulse width modulated (PWM) signal applied to an inverter and a three-phase current according to it over time.

Referring to FIG. 4, the controller 150 may perform pulse width modulation control on the inverter 120 so that the On period of the pulse width modulated signal $V_1$ provided to the first switching elements S11 and S12, the On period of the pulse width modulated signal $V_2$ provided to the second switching elements S13 and S14, and the on periods of the pulse width modulated signals $V_3$ provided to the third switching elements S15 and S16 are interleaved.

Accordingly, a ripple of the sum of the first phase current I1, the second phase current I2, and the third phase current I3 may be reduced, thereby increasing the charging efficiency of the battery 110.

Meanwhile, some components of the vehicle 1 may be software and/or hardware components such as a Field Programmable Gate Array (FPGA) and an Application Specific Integrated Circuit (ASIC).

As described above, the disclosed exemplary embodiments have been described with reference to the accompanying drawings. Those skilled in the art will understand that the present disclosure may be implemented in a form different from the disclosed exemplary embodiments without changing the technical spirit or essential features of the present disclosure. The disclosed exemplary embodiments are exemplary and should not be construed as limiting.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present disclosure have been shown and described, it would be appreciated by those skilled in the art that changes may be made to these embodiments without departing from the principles and spirit of the present disclosure, the scope of which is defined in the claims and their equivalents.

According to the present disclosure, even if a current sensor measuring a three-phase current fails while charging a battery, it is possible to achieve user convenience by continuing charging by using a current sensor that has not failed.

What is claimed is:
1. A vehicle comprising:
 a motor including:

a neutral node configured to receive a charging voltage from a charger; and
a first winding, a second winding, and a third winding connected to the neutral node;
an inverter configured to boost the charging voltage, the inverter including:
first switching elements connected to the first winding;
second switching elements connected to the second winding; and
third switching elements connected to the third winding;
a battery configured to receive the boosted charging voltage;
a first current sensor configured to measure a first phase current flowing through the first winding;
a second current sensor configured to measure a second phase current flowing through the second winding;
a third current sensor configured to measure a third phase current flowing through the third winding; and
a controller configured to:
determine an average duty ratio of a pulse width modulated signal provided to the inverter based on the charging voltage and battery voltage of the battery;
determine a duty ratio of a pulse width modulated signal provided to each of the first, second, third switching elements based on the first, second, third phase currents; and
determine the duty ratio of the pulse width modulated signal provided to the first switching elements based on the average duty ratio of the pulse width modulated signal provided to the inverter, the duty ratio of the pulse width modulated signal provided to the second switching elements, the duty ratio of the pulse width modulated signal provided to the third switching elements when the first current sensor fails.

2. The vehicle according to claim 1, wherein the controller is configured to:
determine the duty ratio of the pulse width modulated signal provided to the first switching elements; and
determine that the average duty ratio of the pulse width modulated signal provided to the inverter is an average of the duty ratio of the pulse width modulated signal provided to the first switching elements, the duty ratio of the pulse width modulated signal provided to the second switching elements, and the duty ratio of the pulse width modulated signal provided to the third switching elements.

3. The vehicle according to claim 1, wherein the controller is configured to:
determine the duty ratio of the pulse width modulated signal provided to the first switching elements and the second switching elements based on the average duty ratio of the pulse width modulated signal provided to the inverter, the duty ratio of the pulse width modulated signal provided to the third switching elements when the first current sensor and the second current sensor fail.

4. The vehicle according to claim 3, wherein the controller is configured to:
determine the duty ratio of the pulse width modulated signal provided to the first switching elements and the second switching elements; and
determine that the average duty ratio of the pulse width modulated signal provided to the inverter is an average of the duty ratio of the pulse width modulated signal provided to the first switching elements, the duty ratio of the pulse width modulated signal provided to the second switching elements, and the duty ratio of the pulse width modulated signal provided to the third switching elements.

5. The vehicle according to claim 4, wherein the controller is configured to:
equally determine the duty ratio of the pulse width modulated signal provided to the first and second switching elements.

6. The vehicle according to claim 1, wherein the controller is configured to:
perform pulse width modulation control on the inverter only when at least one current sensor among the first, second, and third current sensors operates normally.

7. The vehicle according to claim 1, wherein the vehicle further comprises:
a temperature sensor configured to measure a temperature of each of the first switching elements, each of the second switching elements, and each of the third switching elements,
wherein the controller is configured to perform pulse width modulation control on the inverter only when the temperature measured by the temperature sensor is below a preset temperature.

8. The vehicle according to claim 1, wherein the controller is configured to:
perform pulse width modulation control on the inverter so that an ON period of the pulse width modulated signal provided to the first switching elements, an ON period of the pulse width modulated signal provided to the second switching elements, and an ON period of the pulse width modulated signal provided to the third switching elements are interleaved.

9. A vehicle comprising:
a motor including:
a neutral node configured to receive a charging voltage from a charger; and
a first winding, a second winding, and a third winding connected to the neutral node;
an inverter configured to boost the charging voltage, the inverter including:
first switching elements connected to the first winding;
second switching elements connected to the second winding; and
third switching elements connected to the third winding;
a battery configured to receive the boosted charging voltage;
a first current sensor configured to measure a first phase current flowing through the first winding;
a second current sensor configured to measure a second phase current flowing through the second winding;
a third current sensor configured to measure a third phase current flowing through the third winding;
an input/output port configured to be connected to the charger;
a first relay connected between upper switching elements of the inverter and the input/output port;
a second relay connected between the neutral node and the input/output port; and
a third relay connected between lower switching elements of the inverter and the input/output port; and
a controller configured to:

determine an average duty ratio of a pulse width modulated signal provided to the inverter based on the charging voltage and battery voltage of the battery;

determine a duty ratio of a pulse width modulated signal provided to each of the first, second, third switching elements based on the first, second, third phase currents;

determine the duty ratio of the pulse width modulated signal provided to the first switching elements based on the average duty ratio of the pulse width modulated signal provided to the inverter, the duty ratio of the pulse width modulated signal provided to the second switching elements, the duty ratio of the pulse width modulated signal provided to the third switching elements when the first current sensor fails; and close the second relay and the third relay and open the first relay when the charging voltage provided from the charger is less than the battery voltage of the battery.

10. The vehicle according to claim 9, wherein the controller is configured to:

close the first relay and the third relay and open the second relay when the charging voltage provided from the charger is greater than or equal to the battery voltage of the battery.

11. A controlling method of a vehicle, the method comprising:

receiving a charging voltage from a charger through a neutral node of a motor;

boosting the charging voltage by an inverter connected to the motor;

receiving the boosted charging voltage;

measuring a first phase current flowing through a first winding of the motor by a first current sensor;

measuring a second phase current flowing through a second winding of the motor by a second current sensor;

measuring a third phase current flowing through a third winding of the motor by a third current sensor;

determining an average duty ratio of a pulse width modulated signal provided to the inverter based on the charging voltage and a battery voltage of a battery;

determining a duty ratio of a pulse width modulated signal provided to each of the first, second, and third switching elements based on the first, second, third phase currents, wherein the first switching elements are connected to the first winding, the second switching elements are connected to the second winding, and the third switching elements are connected to the third winding; and determining the duty ratio of the pulse width modulated signal provided to the first switching elements based on the average duty ratio of the pulse width modulated signal provided to the inverter, the duty ratio of the pulse width modulated signal provided to the second switching elements, the duty ratio of the pulse width modulated signal provided to the third switching elements when the first current sensor fails.

12. The method according to claim 11, wherein determining the duty ratio of the pulse width modulated signal provided to the first switching elements comprises:

determining that the average duty ratio of the pulse width modulated signal provided to the inverter is an average of the duty ratio of the pulse width modulated signal provided to the first switching elements, the duty ratio of the pulse width modulated signal provided to the second switching elements, and the duty ratio of the pulse width modulated signal provided to the third switching elements.

13. The method according to claim 11, wherein the method further comprises:

when the first current sensor and the second current sensor fail, determining the duty ratio of the pulse width modulated signal provided to the first and second switching elements based on the average duty ratio of the pulse width modulated signal provided to the inverter, the duty ratio of the pulse width modulated signal provided to the third switching elements.

14. The method according to claim 13, wherein determining the duty ratio of the pulse width modulated signal provided to the first and second switching elements comprises:

determining the duty ratio of the pulse width modulated signal provided to the first and second switching elements; and determining that the average duty ratio of the pulse width modulated signal provided to the inverter is an average of the duty ratio of the pulse width modulated signal provided to the first switching elements, the duty ratio of the pulse width modulated signal provided to the second switching elements, and the duty ratio of the pulse width modulated signal provided to the third switching elements.

15. The method according to claim 14, wherein determining the duty ratio of the pulse width modulated signal provided to the first and second switching elements comprises:

equally determining the duty ratio of the pulse width modulated signal provided to the first and second switching elements.

16. The method according to claim 11, wherein the method further comprises:

performing pulse width modulation control on the inverter only when at least one current sensor among the first, second, and third current sensors operates normally.

17. The method according to claim 11, wherein the method further comprises:

measuring temperature of each of the first switching elements, each of the second switching elements, and each of the third switching elements; and performing pulse width modulation control on the inverter only when the temperature is below a preset temperature.

18. The method according to claim 11, wherein the method further comprises:

performing pulse width modulation control on the inverter so that an ON period of the pulse width modulated signal provided to the first switching elements, an ON period of the pulse width modulated signal provided to the second switching elements, and an ON period of the pulse width modulated signal provided to the third switching elements are interleaved.

19. The method according to claim 11, wherein the method further comprises:

when the charging voltage provided from the charger is less than the battery voltage of the battery, closing a second relay connected between the neutral node and an input/output port, and a third relay connected between lower switching elements of the inverter and the input/output port, and opening a first relay connected between upper switching elements of the inverter and the input/output port.

20. The method according to claim 19, wherein the method further comprises:

when the charging voltage is greater than or equal to the battery voltage of the battery, closing the first relay and the third relay and opening the second relay.

* * * * *